United States Patent
Dounaev et al.

(10) Patent No.: US 7,212,577 B2
(45) Date of Patent: May 1, 2007

(54) INFORMATION TRANSFER METHODS

(76) Inventors: Igor Borisovich Dounaev, ul. Gogolya, 14a-48, Khimki, Moskovskaya obl. 141400 (RU); Leonid Alexeyevich Letounov, MZHK "Solnechny", 2-105, Gomel 246050 (BY)

( * ) Notice: Subject to any disclaimer, the term of this patent is extended or adjusted under 35 U.S.C. 154(b) by 597 days.

(21) Appl. No.: 10/490,092

(22) PCT Filed: Mar. 20, 2002

(86) PCT No.: PCT/RU02/00102

§ 371 (c)(1),
(2), (4) Date: Mar. 18, 2004

(87) PCT Pub. No.: WO03/032594

PCT Pub. Date: Apr. 17, 2003

(65) Prior Publication Data

US 2005/0069042 A1     Mar. 31, 2005

(30) Foreign Application Priority Data

Oct. 8, 2001   (RU) ............................... 2001127206
Oct. 8, 2001   (RU) ............................... 2001127207

(51) Int. Cl.
*H04L 27/00*   (2006.01)

(52) U.S. Cl. .................. 375/259; 375/285; 375/219; 375/340

(58) Field of Classification Search ................ 375/259, 375/285, 219, 340
See application file for complete search history.

(56) References Cited

U.S. PATENT DOCUMENTS

2002/0136281 A1 *  9/2002  Grohn ........................ 375/219
2005/0078597 A1 *  4/2005  Dounaev et al. ............ 370/204

FOREIGN PATENT DOCUMENTS

JP         10098497 A   *   4/1998

* cited by examiner

*Primary Examiner*—Vu Le
*Assistant Examiner*—Duy Hoang
(74) *Attorney, Agent, or Firm*—Notaro & Michalos PC

(57) ABSTRACT

A use of the invention permits to increase the transmission rate of existing communication lines or their capacity. The method is in that, at the transmitting side: a first and second analog signals are formed from a first and second sequences of digital information samples, the first analog signal being formed from a difference of values of digital information samples of the first sequence and values of digital information samples of the second sequence taken in points of digital information samples of the first sequence, and the second analog signal being formed from digital information samples of the second sequence taken in points of digital information samples of the second sequence, which are between the points of digital information samples of the first sequence, after which the first and second analog signals are summed, and the summary analog signal is transmitted to a communication line; and at the receiving side: the first sequence of digital information samples is restored by means of sampling the summary analog signal with a clock frequency, then the first sequence of digital information samples is converted to the analog signal of the first sequence using the predetermined sampling function, said analog signal of the first sequence is subtracted from the summary analog signal, and the second sequence of digital information samples is restored from the obtained difference analog signal.

7 Claims, 6 Drawing Sheets

INFORMATION TRANSFER METHODS

This application is a 371 of PCT/RU02/00103.

FIELD OF THE INVENTION

This invention relates to information transmission and reception methods and could be used in communication and measurement systems etc.

BACKGROUND OF THE INVENTION

There is a problem of limiting transmission speed when transmitting a discrete information over communication lines.

The greatest possible transmission speed C in a communication line could be determined in accordance with the Shannon's formula:

$$C = \Pi \cdot \log_2 \frac{P_C + P_\Pi}{P_\Pi}, \quad (1)$$

where $\Pi$ is a bandwidth of communication line, KHz; $P_C$ is a power of signal being transmitted, dB; $P_\Pi$ is a power of interference in the communication line, dB.

For a telephone line having a bandwidth $\Pi$ 3.1 KHz (300 Hz–3.4 KHz) and a ratio $P_C/P_\Pi=10000$ (which corresponds to 40 dB), a greatest theoretically possible speed of transmission (and reception) of discrete information is $$C=3.1 \cdot 10^3 \cdot \log_2 10000 = 40 \text{ Kbit/s}.$$

Modem telephone modems of firms "Robotics" and "Motorola" ensure the information transmission and reception speed up to 33.6 Kbit/s at the ratio $P_C/P_\Pi=10000$ (corresponding to 40 dB), which is indicative of implementing the transmission speed close to the potentially possible in accordance with the Shannon's formula.

Known is the method of information transmission, including steps of: at the transmitting side, forming an analog signal by means of converting a sequence of discrete digital information samples to the analog signal using a predetermined sampling function, and transmitting the formed analog signal to a communication line; and at the receiving side, receiving the transmitted analog signal from the communication line, and restoring from it the original sequence of discrete digital information samples (JP 10-098497 A, Int. Cl. H 04 L 27/10, 14.04.1998).

The information transmission and reception speed in such a method for transmitting an information depends on a method for converting a sequence of discrete digital information samples to an analog signal at the transmitting side, and a method for restoring from the analog signal the original discrete digital information samples at the receiving side, and this speed is limited by the utmost capacity of pulse-code modulation (PCM) equipment existing in the communication line.

When transmitting over a single communication line simultaneously two analog signals of the same power $P_{C_1}=P_{C_2}$ (i.e., in the case of decompression into two similar powers), the equation (1) could be rewritten as follows:

$$C = \Pi \cdot \log_2 \frac{P_{C_1} + P_\Pi}{P_\Pi} + \Pi \cdot \log_2 \frac{P_{C_2} + P_\Pi}{P_\Pi}.$$

Then it follows that at a fixed power $$P = \frac{P_{C_1}}{2} + \frac{P_{C_2}}{2} \text{ (i.e., at } P_{C_1} = P_{C_2}\text{)}$$

the maximum information transmission and reception speed could be brought to $C=3.1 \cdot 10^3 \cdot \log_2 5000 + 3.1 \cdot 10^3 \cdot \log_2 5000 \approx 73$ Kbit/s. Hence, in telephone lines, the decompression into two powers allows to increase the information transmission and reception speed and to realize the utmost capacity of existing pulse-code modulation (PCM) equipment, which is 64 Kbit/s.

TASK OF THE INVENTION AND THE TECHNICAL RESULT

The task of the present invention is to develop the method of information transmission using the decomposition into two powers, which method increases the speed of a discrete information transmission, or—what is the same—allows to transmit more information at the same speed.

The technical result of the invention is in that it ensures a passing via an existing communication channel (without changing its parameters) at least two analog signals instead of one analog signal at the same time.

SUMMARY OF THE INVENTION

In order to solve the set task, in a method of information transmission, including steps of: at the transmitting side, forming an analog signal from a sequence of digital information samples using a predetermined sampling function, and transmitting the formed analog signal to a communication line; and at the receiving side, receiving the analog signal from the communication line, and restoring from the analog signal the sequence of digital information samples using the predetermined sampling function,—in accordance with the present invention, the method includes steps of: at the transmitting side: forming a first and second analog signals from a first and second sequences of digital information samples, the first analog signal being formed from a difference of values of digital information samples of the first sequence and values of digital information samples of the second sequence taken in points of digital information samples of the first sequence, and the second analog signal being formed from digital information samples of the second sequence taken in points of digital information samples of the second sequence, which are between points of digital information samples of the first sequence; summing the first and second analog signals, and transmitting the summary analog signal to the communication line; and at the receiving side, first restoring the first sequence of digital information samples by means of sampling the summary analog signal with a clock frequency, then converting the first sequence of digital information samples using the predetermined sampling function to the analog signal of the first sequence; subtracting said analog signal of the first sequence from the summary analog signal; and restoring the second sequence of digital information samples from the obtained difference analog signal.

An additional feature of the method according to the present invention is in that the first and second sequences of samples are formed using a preliminary sampling function, as which is employed a function of the form $$\frac{\sin x \left(\cos\frac{x}{n} - 1\right)}{2n\sin\frac{x}{n}},$$

where $x=2\pi F_u$, $F_u$ is the upper frequency in the spectrum of signal being transmitted, n is a number of employed frequency components, and as the predetermined sampling function is employed a function of the form $$\left(\frac{\sin x \left(\cos\frac{x}{n} - 1\right)}{2n\sin\frac{x}{n}}\right)^2,$$

or a function of the form $$\frac{\sin x \left(\cos\frac{x}{n} - 1\right)\left(1 - \cos\frac{x}{n}\right)^k}{2n\sin\frac{x}{n} \cdot 2^k},$$

where $x=2\pi F_u$, $F_u$ is the upper frequency in the spectrum of signal being transmitted, n (an integer more than one) is a number of employed frequency components, k=1–20 characterizes the degree of truncation of the predetermined sampling function. Moreover, the sample points of the second sequence are formed in the middle between the sample points of the first sequence, and the first and second sequences of digital information samples are supplied from a single information source or from two different information sources.

at the transmitting side.

DETAILED DESCRIPTION OF THE INVENTION

Figure 1:
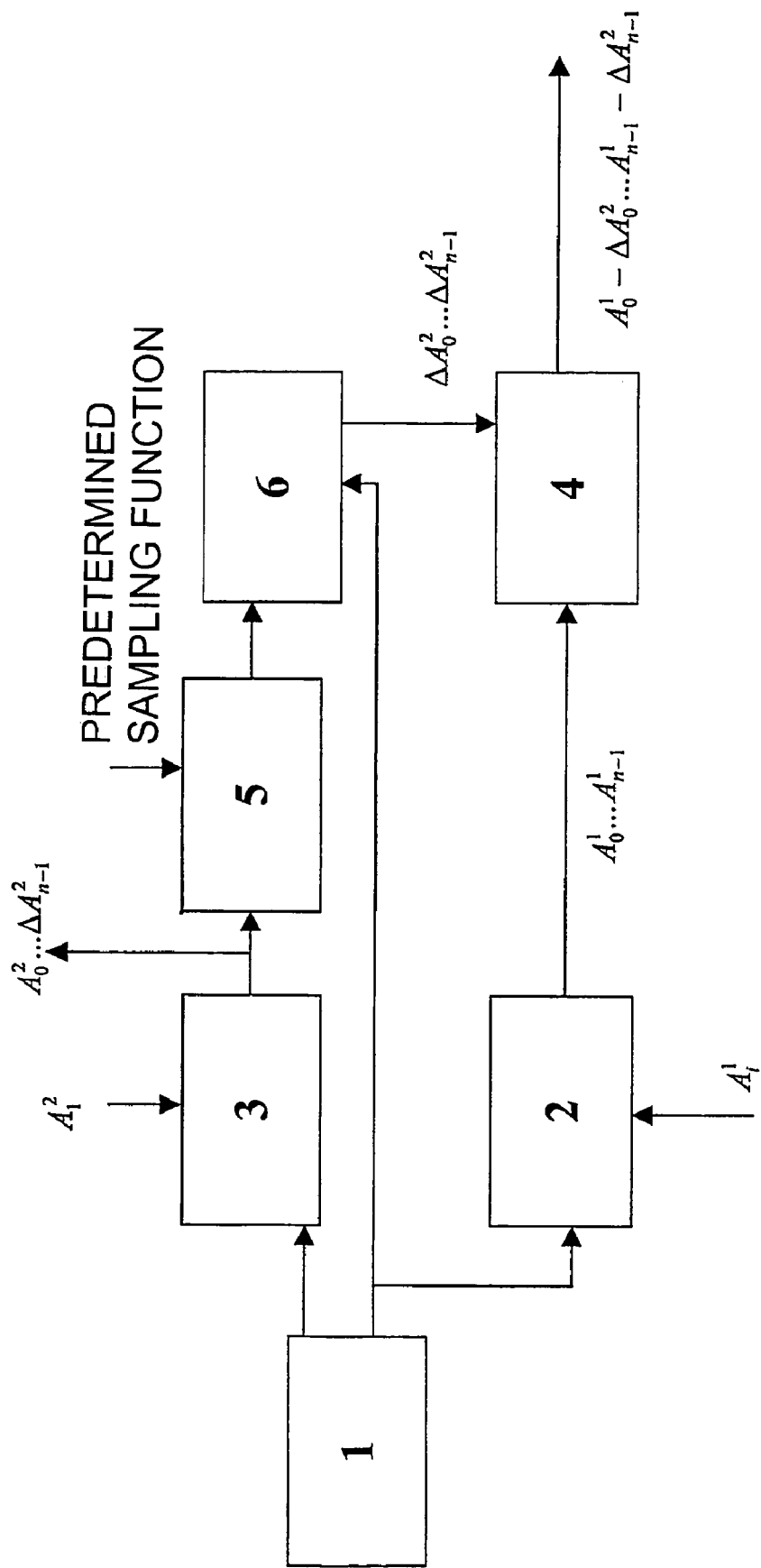
FIG. 1 is the block diagram of the first and second sequences of digital information samples at the transmitting side.
Figure 2:
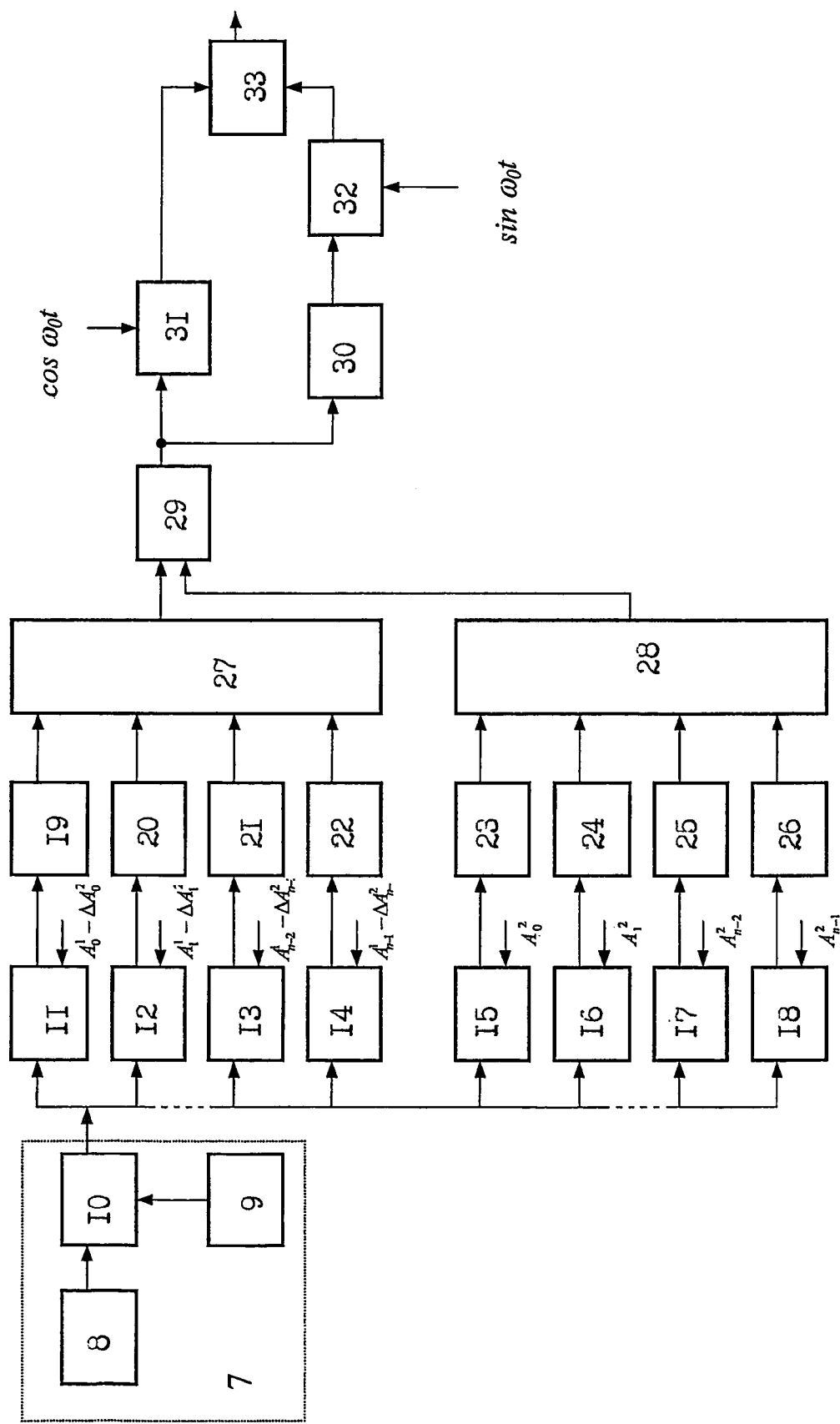
FIG. 2 is the block diagram of forming the summary analog signal at the transmitting side.
Figure 3:
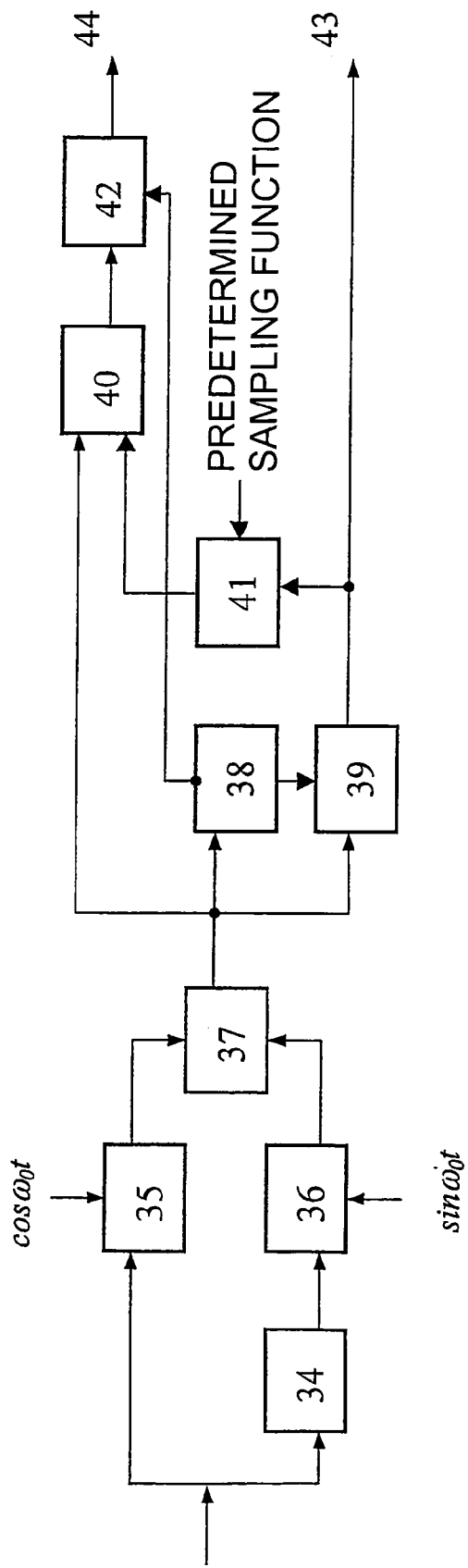
FIG. 3 is the block diagram of communication system at the receiving side.

The method of information transmission according to the present invention is realized in the communication system, the block diagrams of which transmitting and receiving sides are shown, respectively, in FIGS. 1, 2 and 3.

The block diagram of processing the first and second sequences of digital information samples at the transmitting side comprises (see FIG. 1) a clock frequency generator 1, a first 2 and second 3 digital-to-analog converters, a subtractor 4, an envelope former 5, an analog-to-digital (A/D) converter 6.

The clock frequency generator 1 forms at its first output the even signals of the clock frequency, and at its second output the odd signals of the clock frequency. The first output of the clock frequency generator 1 is coupled with the input of the first digital-to-analog (D/A) converter 2, and the second output of the generator 1 is coupled with the input of the second digital-to-analog (D/A) converter 3. The indicated D/A converters 2 and 3 convert the original sequences of discrete digital information samples to a sequence of rectangular signals having amplitudes equal to amplitudes of respective discrete digital samples.

The input of the first D/A converter 2 receives the first sequence of discrete digital information samples $A^1_i$, where i is the index number of digital information sample, i=0, 1, . . . , n−1, which sequence is converted to the first sequence of rectangular digital samples $A^1_0, A^1_1, \ldots A^1_{n-2}, A^1_{n-1}$, of information and outputs from the D/A converter 2 by signals corresponding the even signals of the clock frequency from the clock frequency generator 1. The method implementation is shown for n=4.

The input of the second D/A converter 3 receives the second sequence of discrete digital information samples $A^2_i$, where i=0, 1, . . . , n−1, which sequence is converted to the second sequence of rectangular digital samples $A^2_0, A^2_1, \ldots A^2_{n-2}, A^2_{n-1}$ of information and outputs from the D/A converter 3 by signals corresponding the odd signals of the clock frequency (i.e., with the clock frequency) from the clock frequency generator 1.

The first and second sequences of digital information samples could come both from two independent information sources and from a single information source. In the last case, the sequence of digital samples of original information is divided by known techniques into two its own projections and supplied to the independent informational inputs of the units 2 and 3 in FIG. 1.

The output of the first D/A converter 2 is coupled with an input of subtractor 4. The output of the second D/A converter 3 is coupled with an input of the envelope former 5 (which is a multiplier), and also outputs the second sequence of rectangular digital samples $A^2_0, A^2_1, \ldots A^2_{n-2}, A^2_{n-1}$ of information to the summary analog signal forming unit. A second input of the envelope former 5 is fed with a sampling function from sampling function generator. This sampling function hereinafter referring to as the predetermined one, could have the form $$\frac{\sin x}{x}, \text{ or } \frac{\sin x \left(\cos \frac{x}{n} - 1\right)}{2n \sin \frac{x}{n}}.$$

The output of the envelope former 5 is coupled with a first input of the analog-to-digital (A/D) converter 6. At the output of the envelope former 5 is formed an envelope of the second sequence of digital information samples, which is supplied to the first input of the A/D converter 6, to which second input are supplied even clock frequency signals from the first output of the clock frequency generator 1.

The output of the A/D converter 6 is coupled with an input of the subtractor 4. The A/D converter 6 performs the calculation (sampling) of values of samples of the second sequence of digital information samples in the points of samples of the first sequence, which are supplied to a second input of the subtractor 4 in the form of rectangular signal sequence $\Delta A^2_i$: $\Delta A^2_0$, $\Delta A^2_1$, ..., $\Delta A^2_{n-2}$, $\Delta A^2_{n-1}$. The subtractor 4 performs the subtraction from the first sequence of rectangular digital samples $A^1_0$, $A^1_1$, ..., $A^1_{n-2}$, $A^1_{n-1}$, the corresponding values $\Delta A^2_0$, $\Delta A^2_1$, ..., $\Delta A^2_{n-2}$, $\Delta A^2_{n-1}$ sampled (calculated) in the A/D converter 6.

A sequence of the difference of digital information samples $A^1_0$, $\Delta A^2_0$, ..., $A^1_{n-1} - \Delta A^1_{n-1}$, as well as the second sequence of digital information samples $A^2_0$, $A^2_1$, ..., $A^2_{n-2}$, $A^2_{n-1}$, converted to rectangular pulses are supplied to respective inputs of the summary analog signal forming unit at the transmission side (see FIG. 2).

The sequences of digital information samples $A^2_0$, $A^2_1$, ..., $A^2_{n-2}$, $A^2_{n-1}$ and samples $A^1_0 - \Delta A^2_0$, ..., $A^1_{n-1} - \Delta A^2_{n-1}$, before they come to the summary analog signal forming unit (see FIG. 2), are converted by known methods to a parallel code using a serial-to-parallel converter (not shown).

The block diagram of the summary analog signal forming unit at the transmission side comprises (see FIG. 2) a predetermined sampling function former 7 which consists of a first (preliminary) sampling function generator 8, second (predetermined) sampling function generator 9, and predetermined sampling function multiplier 10 which inputs are connected to outputs of sampling function generators 8 and 9, and an output is an output of the predetermined sampling function former 7.

Further, the transmitting side includes two groups of multipliers 11–14 and 15–18, each of which comprises n (FIG. 2 shows an example for n=4) multipliers of the predetermined sampling function and a sequence of digital information samples, which sequence is supplied to information inputs of the multipliers. Reference inputs of the multipliers 11–14 and 15–18 are joint and connected to the output of the predetermined sampling function former 7.

Information inputs of the multipliers 11–14 and 15–18 are fed, respectively, with the sequence of difference of digital information samples of the first sequence and digital samples in the points of the first sequence samples $A^1_0 - \Delta A^2_0$, ..., $A^1_{n-1} - \Delta A^2_{n-1}$, and the second sequence of digital information samples $A^2_0$, $A^2_1$, ..., $A^2_{n-2}$, $A^2_{n-1}$.

An output of each of the multipliers 11–14 and 15–18 is coupled via a corresponding delay element 19–22 and 23–26 with a corresponding input of a first envelope former 27 and second envelope former 28, respectively. Outputs of these envelope formers 27 and 28 are connected to inputs of a summer 29 which output is coupled, directly and via a quadrature phase-shifter 30 with information inputs of, respectively, first and second output multipliers 31 and 32, to reference inputs of which are supplied quadrature reference waveforms of the carrier frequency $f_0$, respectively cos $\omega_0 t$ and sin $\omega_0 t$, where $\omega_0 = 2\pi f_0$. Outputs of the multipliers 31 and 32 are connected to respective inputs of a summer 33 which output is connected to an input of communication channel (not shown), for example, wireless line.

In the diagram of FIG. 2, the delay elements 19–22 and 23–26 ensure: various time delay of analog signals coming to their inputs, phase shift of the predetermined sampling function from 0 to (n−1)π, respectively, and forming of envelope elements (fragments). The first delay element 19 of the first group delays an analog signal coming to its input for 0 sec. (not delays a signal), i.e., this element is depicted in the diagram of FIG. 2 only for the uniformity. Each next one from delay elements 20–22 has the analog signal delay time differed from the delay time of the previous element for a value of repetition period of the sequence of digital information samples $T_c = 1/F_u$, where $F_u$ is the upper frequency in the spectrum of the analog signal being transmitted. The same rule is retained also for delay elements 23–26 of the second group, but the first delay element 23 has the delay time of $T_c/2$.

The quadrature phase-shifter 30 ensures a phase change of analog signal coming to its input by the value π/2 (for the carrier $f_0$).

The receiving side of communication system comprises (FIG. 3) a quadrature phase-shifter 34 which input is united with an information input of a first input multiplier 35 and connected to the output of the communication channel (not shown), and an output of the quadrature phase-shifter 34 is coupled with an information input of a second input multiplier 36. Reference inputs of the first and second input multipliers 35 and 36 are fed with the same quadrature waveforms of the carrier frequency $f_0$, respectively cos $\omega_0 t$ and sin $\omega_0 t$, as at the transmission side. Outputs of the input multipliers 35 and 36 are connected to respective inputs of subtractor 37 which output is coupled with inputs of clock frequency extractor 38, first analog-to-digital (A/D) converter 39, and first input of subtractor 40. An output of the first A/D converter 39 is coupled with a first input of envelope former 41 which second input is fed with a predetermined sampling function having the identical form with the predetermined sampling function at the transmitting side, and an output of said former 41 is connected to a second input of the subtractor 40. Direct and inverting outputs of the clock frequency extractor 38 are connected to clock inputs of, respectively, the first A/D converter 39 and second A/D converter 42, outputs of which converters being, respectively, an output 43 of first sequence of digital information samples and an output 44 of second sequence of digital information samples.

The quadrature phase-shifter 34 ensures a phase change of summary analog signal coming to its input by the value π/2 (for the carrier $f_0$).

The clock frequency extractor 38 could have any known embodiment ensuring the obtainment of the clock frequency signal from the summary analog signal coming to the input of the receiving side depending on how the clock signal is inserted into the summary analog signal being transmitted. In FIG. 3 the inverting output of the clock frequency extractor 38 is marked out by a point.

As the first sampling function being formed by the preliminary sampling function generator 8, could be used the known function of the type $$\frac{\sin x}{x},$$

where $x=2\pi F_u$, $F_u$ is the upper frequency in the spectrum of the analog signal being transmitted. However, in order to decrease distortions when transmitting discrete information samples over real communication channels having a carrier, it is expedient to select as the first (preliminary) sampling function the function of the type:

$$\frac{\sin x \left(\cos \frac{x}{n} - 1\right)}{2n \sin \frac{x}{n}}, \qquad (2)$$

where $x=2\pi F_u$, $F_u$ is the upper frequency in the spectrum of the analog signal being transmitted, n is an integer more than one and equal to a number of used frequency components in the analog signal spectrum. The value n is defined in accordance with the formula $n=T/T_c$, where T is the given processing interval (the period of the predetermined sampling function), in this case 10.66667 ms, and $T_c$ is a repetition period of the sequence of digital information samples.

Figure 4:
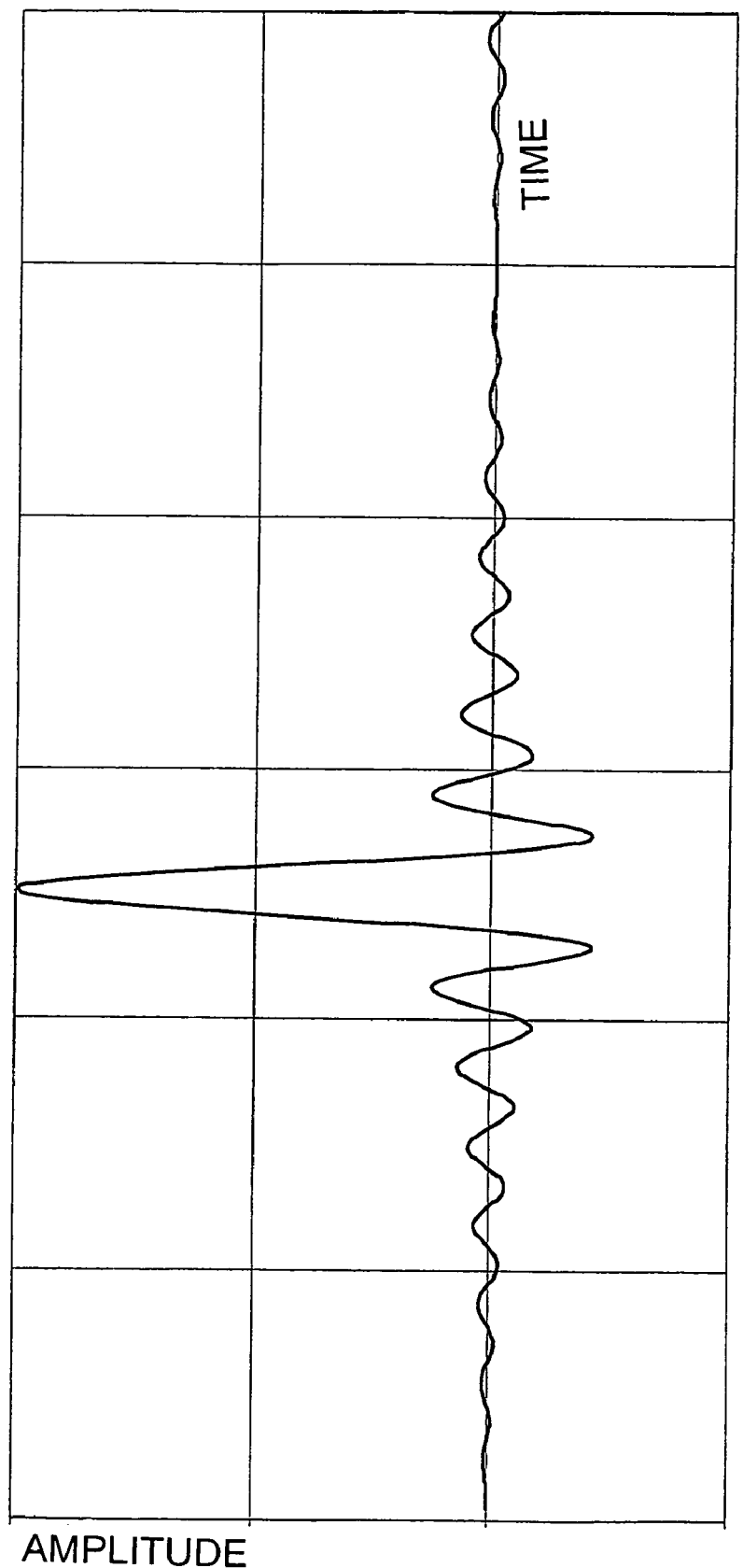
FIG. 4 is the view of the sampling function $$\frac{\sin x \left(\cos\frac{x}{n} - 1\right)}{2n\sin\frac{x}{n}};$$
Figure 5:
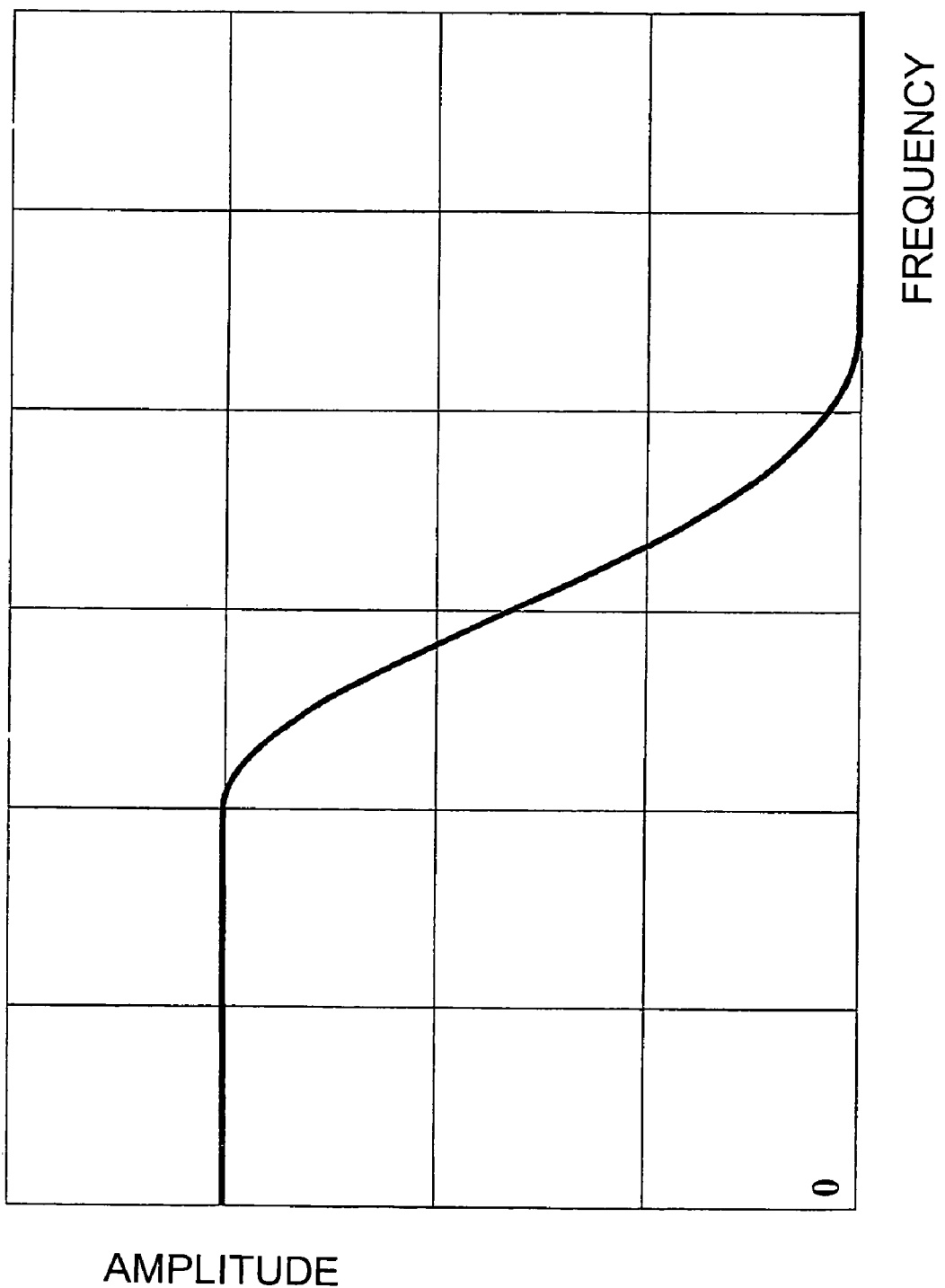
FIG. 5 is the spectrum of the sampling function shown in FIG. 4.

The indicated preliminary sampling function has the form shown in FIG. 4 (the function is shown for n=16), and spectrum shown in FIG. 5.

Figure 6:
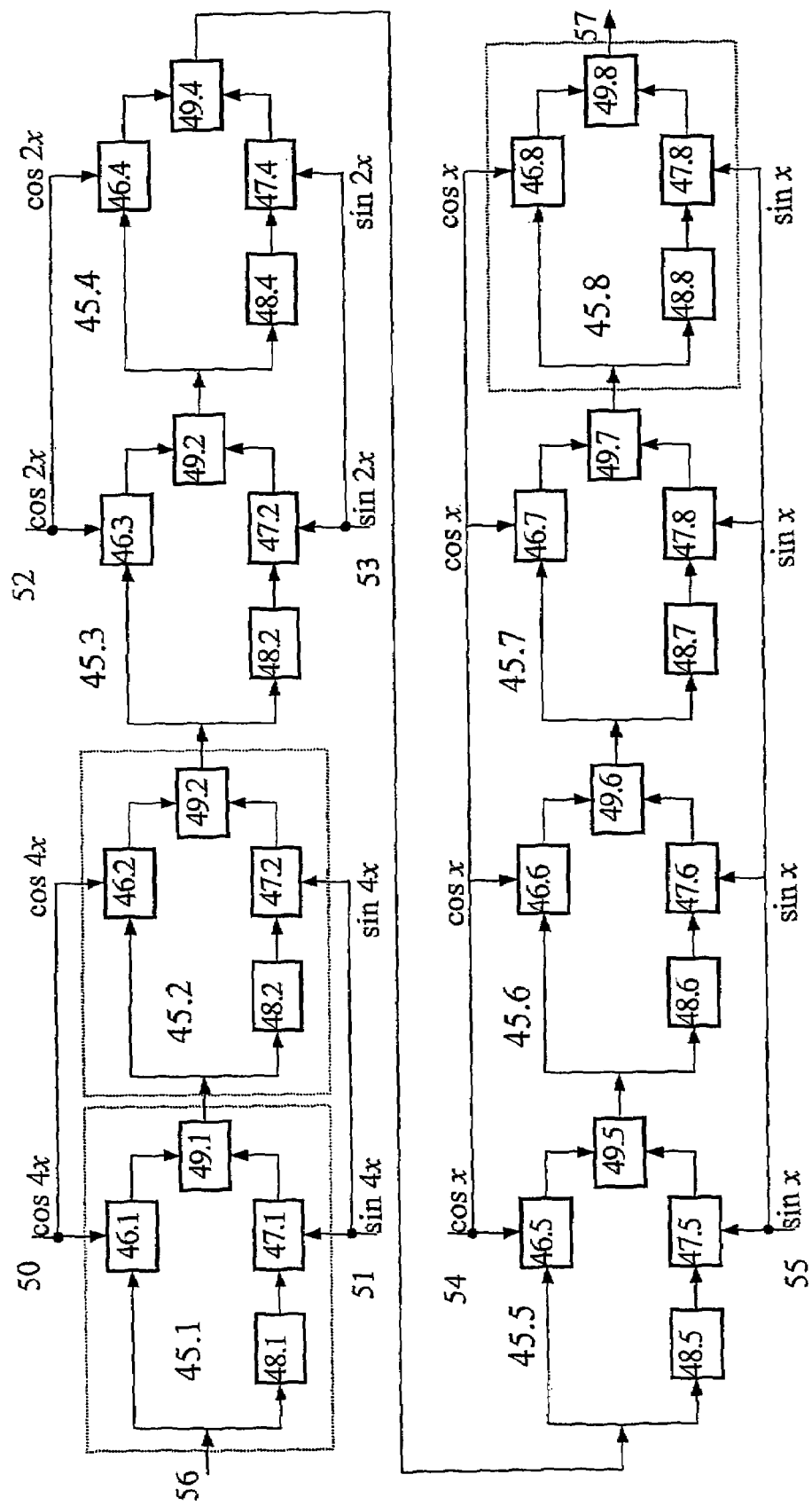
FIG. 6 is the block diagram of the generator of the predetermined sampling function of the form $$\frac{\sin x \left(\cos\frac{x}{n} - 1\right)}{2n\sin\frac{x}{n}}$$

A block diagram of the generator of such preliminary sampling function is depicted in FIG. 6. This generator comprises eight separate conversion units 45.1 to 45.8 connected in series. Each conversion unit includes a first 46 and second 47 multipliers, quadrature phase-shifter 48, and summer 49. In FIG. 6 each of eight used conversion units 45 is marked with the reference 45.j, where j indicates the index number of this conversion unit 45. Each element of the corresponding conversion unit 45 has a double reference as well, where the second digit indicates the number of that conversion unit 45 which comprises this element. In every conversion unit 45, an output of the quadrature phase-shifter 48 is coupled with an information input of the second multiplier 47, and outputs of both multipliers 46 and 47 are connected to respective inputs of the summer 49. An output of the quadrature phase-shifter 48 is united with an information input of the first multiplier 46 and is an information input of this conversion unit 45, and an output of the summer 49 is an output of this conversion unit 45.

Reference inputs of the first multipliers 46.1 and 46.2 and reference inputs of the second multipliers 47.1 and 47.2 of the first and second conversion units 45.1 and 45.2 are respectively united and are inputs 50 and 51 of quadrature reference waveforms of doubled sampling frequency of the whole generator, i.e., the frequency that corresponds to the value 4x in expression (2). Reference inputs of the first multipliers 46.3 and 46.4 and reference inputs of the second multipliers 47.3 and 47.4 of the third and fourth conversion units 45.3 and 45.4 are respectively united and are inputs 52 and 53 of quadrature reference waveforms of the sampling frequency of the whole generator, i.e., the frequency that corresponds to the value 2x in the expression (2). At last, reference inputs of the first multipliers 46.5, 46.6, 46.7 and 46.8 and reference inputs of the second multipliers 47.5, 47.6, 47.7 and 47.8 of the fifth to eighth conversion units 45.5, 45.6, 45.7 and 45.8 are respectively united and are inputs 54 and 55 of quadrature reference waveforms of the half sampling frequency, i.e., the frequency that corresponds to the value x in the expression (2). An information input of the first conversion unit 45.1 is an information input 56 of the generator, and an output of the eighth conversion unit 45.8 is an output 57 of the preliminary sampling function generator.

The quadrature phase-shifter 48 in every conversion unit 45 ensures a change of phase of signal coming to its input by the value $\pi/2$ (for the upper frequency $F_u$ in the spectrum of analog signal being transmitted).

In order to generate the preliminary sampling function, the input of the preliminary sampling function generator is fed with a rectangular pulses of unit amplitude with the frequency $F_u$ (the upper frequency in the spectrum of analog signal being transmitted). Quadrature reference waveforms are fed to the respective inputs of the preliminary sampling function generator from an external pulse generator forming at its outputs quadrature reference waveforms of doubled, single and half sampling frequency.

The second (predetermined) sampling function being generated by the generator 9 in the predetermined sampling function former 7 could have various forms. Below, examples are given for implementing the method of the present invention for two different forms of the second sampling function at the output of the generator 9:

$$\left| \sqrt{\frac{\sin x \left(\cos \frac{x}{n} - 1\right)}{2n \sin \frac{x}{n}}} \right| \qquad (3)$$

and $$\frac{\left(\cos \frac{x}{n} - 1\right)^k}{2^k}, \qquad (4)$$

where k=1–20 and characterizes a truncation degree of the predetermined sampling function. In the case, when the second sampling function generator 9 generates the first one from the above functions, defined by the expression (3), the subtractor 37 at the receiving side has at its output a digital filter with a pulse response characteristic of the type (3).

The method of information transmission in accordance with the present invention is realized in a communication system of FIGS. 1, 2 and 3 as follows.

Two (a first $A^1_i$ and a second $A^2_i$) independent sequences of discrete digital information samples received either from the same information source, or from two information sources having the same repetition period $T_c=1/F_u$ of the sequence of digital information samples, where $F_u$ is the upper frequency in the spectrum of an analog signal being transmitted, are fed simultaneously to the inputs of, respectively, the first (2) and second (3) D/A converters. After the D/A converters 2 and 3 the converted sequences of digital samples are directed: the first sequence of digital information samples $A^1_0, A^1_1, \ldots, A^1_{n-2}, A^1_{n-1}$ is fed to the input of the subtractor 4, and the second sequence of digital information samples $A^2_0, A^2_1, \ldots, A^2_{n-2}, A^2_{n-1}$ is fed to the input of the envelope former 5 and, through a serial-to-parallel converter, each sample of the second sequence is fed to the corresponding information input of multipliers 15–18 of the summary analog signal forming unit (FIG. 2). Since the first D/A converter 2 is fed from the clock frequency generator with even signals, and the second D/A converter 3 is fed with odd signals, then the digital information samples $A^2_0, A^2_1, \ldots, A^2_{n-2}, A^2_{n-1}$ of the second sequence after the D/A converter 3 will be taken in points of digital information samples of the second sequence, which are between points of digital information samples of the first sequence.

In the envelope former 5 the following steps take place: forming the second sequence of digital information samples in the points of digital samples of the second sequence using the predetermined sampling function, determining the digital sample values in the points of digital samples of the first sequence, and subsequent forming the second sequence of digital information samples taken in the points of digital samples of the first sequence: $\Delta A^2_0, \Delta A^2_1, \ldots, \Delta A^2_{n-2}, \Delta A^2_{n-1}$. This sequence of digital information samples is fed to the subtractor 4, where takes place the subtraction of values of digital information samples of the second sequence taken in the points of digital information samples of the first sequence $\Delta A^2_0, \Delta A^2_1, \ldots, \Delta A^2_{n-2}, \Delta A^2_{n-1}$, from the values of digital information samples of the first sequence $A^1_0, A^1_1, \ldots, A^1_{n-2}, A^1_{n-1}$, and the difference in the form of digital information samples $A^1_0-\Delta A^2_0, \ldots, A^1_{n-1}-\Delta A^2_{n-1}$ are fed through the serial-to-parallel converter to respective information inputs of the multipliers 11–14 of the summary analog signal forming unit.

The preliminary sampling function generator 8 (FIG. 2) forms the first sampling function defined by the expression (2) at the time interval $T_c=10.66667$ ms. The generator 9 generates the second, predetermined sampling function defined by the expression (3) or (4). In so doing, at the output of the multiplier 10 in the predetermined sampling function former 7, in dependence on a specific type of the second sampling function, a signal is formed of a type $$\frac{\sin x\left(\cos\frac{x}{n}-1\right)}{2n\sin\frac{x}{n}} \cdot \sqrt{\left|\frac{\sin x\left(\cos\frac{x}{n}-1\right)}{2n\sin\frac{x}{n}}\right|} \quad (5)$$

$$\text{or} \quad \frac{\sin x\left(\cos\frac{x}{n}-1\right)\left(1-\cos\frac{x}{n}\right)^k}{2n\sin\frac{x}{n}\cdot 2^k}, \quad (6)$$

where k characterizes the degree of truncation of the predetermined sampling function, e.g., k=16.

This predetermined sampling function is fed to the reference inputs of all multipliers 11–14 and 15–18 (FIG. 2).

From the processing unit of the first and second sequences of digital information samples, respective digital information samples $A^1_0-\Delta A^2_0, \ldots, A^1_{n-1}-\Delta A^2_{n-1}$, are fed to the information inputs of the first group of multipliers 11–14, and respective digital information samples $A^2_0, A^2_1, \ldots, A^2_{n-2}, A^2_{n-1}$ are fed to the information inputs of the second group of multipliers 15–18 (preferably, sample points of the second sequence $A^2_0, A^2_1, \ldots, A^2_{n-2}, A^2_{n-1}$ are in the middle between sample points of the first sequence).

As a result, at an output of each multiplier 11–14 of the first group, depending on the type of the second, predetermined sampling function, is formed an analog signal of a type (where i is an index number of digital information sample, i=0, 1, ..., n-1):

$$(A^1_i - \Delta A^2_i)\cdot \frac{\sin x\left(\cos\frac{x}{n}-1\right)}{2n\sin\frac{x}{n}} \cdot \sqrt{\left|\frac{\sin x\left(\cos\frac{x}{n}-1\right)}{2n\sin\frac{x}{n}}\right|},$$

$$\text{or} \quad (A^1_i - \Delta A^2_i)\cdot \frac{\sin x\left(\cos\frac{x}{n}-1\right)\left(1-\cos\frac{x}{n}\right)^k}{2n\sin\frac{x}{n}\cdot 2^k}.$$

At an output of each delay element 19–22 following a multiplier 11–14 of the first group, an analog signal will be defined, taking into account a phase shift by 0 to $(n-1)\pi$, by the expression:

$$(A^1_i - \Delta A^2_i)\cdot \frac{\sin(x-i\pi)\left[\cos\left(\frac{x-i\pi}{n}-1\right)\right]}{2n\cdot\sin\frac{x-i\pi}{n}}\cdot$$

$$\sqrt{\left|\frac{\sin(x-i\pi)\left[\cos\left(\frac{x-i\pi}{n}-1\right)\right]}{2n\cdot\sin\frac{x-i\pi}{n}}\right|},$$

$$\text{or} \quad (A^1_i-\Delta A^2_i)\cdot \frac{\sin(x-i\pi)\left[\cos\left(\frac{x-i\pi}{n}-1\right)\right]\left[1-\cos\left(\frac{x-i\pi}{n}\right)\right]^k}{2n\cdot\sin\frac{x-i\pi}{n}\cdot 2^k}.$$

At an output of each multiplier 15–18 of the second group, an analog signal is formed of the type:

$$A^2_i\cdot \frac{\sin x\left(\cos\frac{x}{n}-1\right)}{2n\sin\frac{x}{n}} \cdot \sqrt{\left|\frac{\sin x\left(\cos\frac{x}{n}-1\right)}{2n\sin\frac{x}{n}}\right|},$$

$$\text{or} \quad A^2_i\cdot \frac{\sin x\left(\cos\frac{x}{n}-1\right)\left(1-\cos\frac{x}{n}\right)^k}{2n\sin\frac{x}{n}\cdot 2^k}.$$

At an output of delay element 23–26 following a multiplier 15–18 of the second group, an analog signal will be defined, taking into account a phase shift by 0 to $(n-1)\pi$, by the expression:

$$A^2_i\cdot \frac{\sin\left(x-\frac{\pi}{2}-i\pi\right)\left[\cos\left(\frac{x-\frac{\pi}{2}-i\pi}{n}-1\right)\right]}{2n\cdot\sin\frac{x-\frac{\pi}{2}-i\pi}{n}}\cdot$$

$$\sqrt{\left|\frac{\sin\left(x-\frac{\pi}{2}-i\pi\right)\left[\cos\left(\frac{x-\frac{\pi}{2}-i\pi}{n}-1\right)\right]}{2n\cdot\sin\frac{x-\frac{\pi}{2}-i\pi}{n}}\right|},$$

or $A_i^2 \cdot \dfrac{\sin\left(x - \dfrac{\pi}{2} - i\pi\right)\left[\cos\left(\dfrac{x - \dfrac{\pi}{2} - i\pi}{n} - 1\right)\right]\left[1 - \cos\left(\dfrac{x - \dfrac{\pi}{2} - i\pi}{n}\right)\right]^k}{2n \cdot \sin\dfrac{x - \dfrac{\pi}{2} - i\pi}{n} \cdot 2^k}.$ At the output of the former 27 the first envelope $a^1(x)$ is described by the following expression:

$$a^1(x) = \sum_{i=0}^{n-1}(A_i^1 - \Delta A_i^2) \cdot$$

$$\dfrac{\sin(x - i\pi)\left[\cos\left(\dfrac{x - i\pi}{n} - 1\right)\right]}{2n \cdot \sin\dfrac{x - i\pi}{n}} \cdot \sqrt{\left|\dfrac{\sin(x - i\pi)\left[\cos\left(\dfrac{x - i\pi}{n} - 1\right)\right]}{2n \cdot \sin\dfrac{x - i\pi}{n}}\right|},$$

or $a^1(x) = \sum_{i=0}^{n-1}(A_i^1 - \Delta A_i^2) \cdot$ $$\dfrac{\sin(x - i\pi)\left[\cos\left(\dfrac{x - i\pi}{n} - 1\right)\right]\left[1 - \cos\left(\dfrac{x - i\pi}{n}\right)\right]^k}{2n \cdot \sin\dfrac{x - i\pi}{n} \cdot 2^k}.$$

At an output of the former 28 the second envelope $a^2(x)$ is described by the following expression:

$$a^2(x) = \sum_{i=0}^{n-1} A_i^2 \cdot \dfrac{\sin\left(x - \dfrac{\pi}{2} - i\pi\right)\left[\cos\left(\dfrac{x - \dfrac{\pi}{2} - i\pi}{n} - 1\right)\right]}{2n \cdot \sin\dfrac{x - \dfrac{\pi}{2} - i\pi}{n}}.$$

$$\sqrt{\left|\dfrac{\sin\left(x - \dfrac{\pi}{2} - i\pi\right)\left[\cos\left(\dfrac{x - \dfrac{\pi}{2} - i\pi}{n} - 1\right)\right]}{2n \cdot \sin\dfrac{x - \dfrac{\pi}{2} - i\pi}{n}}\right|},$$

or $a^2(x) = \sum_{i=0}^{n-1} A_i^2 \cdot$ $$\dfrac{\sin\left(x - \dfrac{\pi}{2} - i\pi\right)\left[\cos\left(\dfrac{x - \dfrac{\pi}{2} - i\pi}{n} - 1\right)\right]\left[1 - \cos\left(\dfrac{x - \dfrac{\pi}{2} - i\pi}{n}\right)\right]^k}{2n \cdot \sin\dfrac{x - \dfrac{\pi}{2} - i\pi}{n} 2^k}.$$

In two last expressions, regardless of specific type of the used predetermined sampling function, the envelope $a^2(x)$ in the sample points $x=i\pi$ has the following values: $a^2(x)=\Delta A_0^2$ for $i=0$, $a^2(x)=\Delta A_1^2$ for $i=1, \ldots, a^2(x)=\Delta A_{n-1}^2$ for $i=n-1$.

At an output of the summer 29 an analog signal $a^1(x)+a^2(x)$ is provided, which takes the values of the first envelope in the sample points of the first analog signal, and is fed to units 30–33 for implementing a one-sideband modulation in order to transfer the summary analog signal $a^1(x)+a^2(x)$ to a carrier frequency $f_0$. To this end, the summary analog signal $a^1(x)+a^2(x)$ is fed directly to the first output multiplier 31, and through the quadrature phase-shifter 30 to the second output multiplier 32. The multipliers 31 and 32 perform the multiplication of the direct and phase shifted summary analog signals $a^1(x)+a^2(x)$ by the quadrature waveforms of the carrier frequency, after which the results of this multiplication are summed by the output summer 27, and the thus formed summary analog signal is fed to the communication line.

The summary analog signal received at the receiving side (FIG. 3) passes the units 34–39 which perform the conversion inverse to the performed in the units 30–33 at the transmitting side. I.e., the received summary analog signal passes directly and through the quadrature phase-shifter 34, respectively, to the first and second input multipliers 35 and 36 which reference inputs are fed with the same quadrature reference waveforms of the carrier frequency $f_0$ as the multipliers 31 and 32 at the transmitting side.

As a result, at outputs of the first and second input multipliers 35 and 36 are formed quadrature components of the received summary analog signal.

These quadrature components are subtracted in the subtractor 37, at which output is connected a digital filter having a pulse response characteristic of the type (3), if the second, predetermined sampling function generator 9 generates the function of the type (3). In this case, at an output of the subtractor with the digital filter is formed an analog signal $a^1_r(x)+a^2_r(x)$, which components are described by the expressions:

$$a^1_r(x) = \sum_{i=0}^{n-1}(A_i^1 - \Delta A_i^2) \cdot \left(\dfrac{\sin(x - i\pi) \cdot \left(\cos\dfrac{x - i\pi}{n} - 1\right)}{2n \cdot \sin\dfrac{x - i\pi}{n}}\right)^2,$$

$$a^2_r(x) = \sum_{i=0}^{n-1} A_i^1 \cdot \left(\dfrac{\sin\left(x - \dfrac{\pi}{2} - i\pi\right) \cdot \left(\cos\dfrac{x - \dfrac{\pi}{2} - i\pi}{n} - 1\right)}{2n \cdot \sin\dfrac{x - \dfrac{\pi}{2} - i\pi}{n}}\right)^2.$$

In the case, when the second, predetermined sampling function generator 9 forms the predetermined sampling function of the type (4), the filter at the output of the subtractor 37 is not necessary. At the output of the subtractor 37 is then formed the signal $a^1_r(x)+a^2_r(x)$, which quadrature components are described by the same expressions as the components $a^1(x)+a^2(x)$ at the output of the summer 29 at the transmitting side (FIG. 2).

The clock frequency extractor 38 extracts the signal with the clock frequency (sampling frequency at the transmitting side) from this summary analog signal, which clock frequency signal is employed for clocking the first 39 and second 42 A/D converters, the clocking of both these A/D converters being performed in antiphase. Values of analog signal $a^1_r(x)$ comes from the output of the first A/D converter 39 in the moment of clocking digital information samples of the first sequence, i.e., in those very moments that correspond the sample points of digital information samples of the first sequence at the transmitting side. These digital information samples come to the output 43 in the form of the original first sequence of digital information samples $A^1_i$ which are restored by sampling the summary analog signal with the clocking frequency.

The indicated restored first sequence of digital information samples is fed to the input of the envelope former 41 which implements its conversion, using the predetermined sampling function, to the analog signal $a^1_r(x)$ of the first sequence, which is then fed to the second input of the subtractor 40 which first input is fed with the summary analog signal $a^1_r(x)+a^2_r(x)$ from the output of the summer 37. The subtractor 40 subtracts the analog signal $a^1_r(x)$ of the first sequence from the summary analog signal $a^1_r(x)+a^2_r(x)$ with the result that an analog signal is formed at the output of the subtractor 40, which analog signal being the analog signal $a^2_r(x)$ that has the following values in the sample points $x=i\pi$: $a^2_r(x)=\Delta A^2_0$ for $i=0$, $a^2_r(x)=\Delta A^2_1$ for $i=1,\ldots$, $a^2_r(x)=\Delta A^2_{n-1}$ for $i=n-1$. This analog signal is fed to the input of the second A/D converter 42 which is clocked with the inverted clock frequency (i.e., having the phase shift by $\pi$ relative to the signal at the clock input of the first A/D converter 39). At the output of the second A/D converter 36, after restoring from the received difference analog signal $a^2_r(x)$, is provided the second sequence of digital information samples $A^2_i$ which come to the output 44. Thus, at the outputs 43 and 44 of the receiving side there are restored first and second sequences of digital information samples transmitted over the communication line without changing its parameters, i.e., a decompression is performed.

Hence, the proposed method of information transmission ensures the transmission of at least two analog signals instead of one during the same time over the existing communication line, i.e., increases the information transmission rate, or information capacity of transmission and reception line.

INDUSTRIAL APPLICABILITY

This invention could be used in the communication technique, measurements, and any other applications where it is necessary to transmit or convert an information. In so doing, the proposed method ensures an increase of information transmission rate, or information capability of communication channel.

Although the present invention is described with reference to its specific example of embodiment, this example by no means restricts the scope of invention, which is defined by the enclosed claims taking into account possible equivalents.

The invention claimed is:

1. A method of information transmission, including steps of:
    at the transmitting side:
        forming an analog signal from a sequence of digital information samples using a predetermined sampling function; and
        transmitting the formed analog signal to a communication line; and
    at the receiving side:
        receiving the analog signal from the communication line; and
        restoring from the analog signal the sequence of digital information samples using the predetermined sampling function;
    characterized in that the method further includes the steps of:
    at the transmitting side:
        forming a first and second analog signals from a first and second sequences of digital information samples;
            the first analog signal being formed from a difference of values of digital information samples of the first sequence and values of digital information samples of the second sequence taken in points of digital information samples of the first sequence;
            the second analog signal being formed from digital information samples of the second sequence taken in points of digital information samples of the second sequence, which are between the points of digital information samples of the first sequence;
        summing the first and second analog signals, and transmitting the summary analog signal to the communication line; and
    at the receiving side:
        restoring the first sequence of digital information samples by means of sampling the summary analog signal with a clock frequency;
        converting the first sequence of digital information samples using the predetermined sampling function to the analog signal of the first sequence;
        subtracting said analog signal of the first sequence from the summary analog signal; and
        restoring the second sequence of digital information samples from the obtained difference analog signal.

2. The method according to claim 1, characterized in that the first and second sequences of samples are formed using a preliminary sampling function, as which is employed a function of the form $$\frac{\sin x\left(\cos\frac{x}{n}-1\right)}{2n\sin\frac{x}{n}},$$

where $x=2pF_u$, $F_u$ is the upper frequency in the spectrum of signal being transmitted, n is a number of employed frequency components.

3. The method according to claim 1, characterized in that as the predetermined sampling function is employed a function of the form $$\left(\frac{\sin x\left(\cos\frac{x}{n}-1\right)}{2n\sin\frac{x}{n}}\right)^2,$$

where $x=2pF_u$, $F_u$ is the upper frequency in the spectrum of signal being transmitted, n (an integer more than one) is a number of employed frequency components.

4. The method according to claim 1, characterized in that as the predetermined sampling function is employed a function of the form $$\frac{\sin x\left(\cos\frac{x}{n}-1\right)\left(1-\cos\frac{x}{n}\right)^k}{2n\sin\frac{x}{n}\cdot 2^k},$$

where $x=2pF_u$, $F_u$ is the upper frequency in the spectrum of signal being transmitted, n (an integer more than one) is a number of employed frequency components, k (an integer more than one) characterizes the degree of truncation of the predetermined sampling function.

5. The method according to claim 4, characterized in that k is an integer, $k=1-20$.

6. The method according to claim 1, characterized in that the sample points of the second sequence are formed in the middle between the sample points of the first sequence.

7. The method according to claim 1, characterized in that the first and second sequences of digital information samples are supplied from a single information source or from two different information sources.

* * * * *